W. KING.
Horse Rake.
No. 51,322.  Patented Dec. 5, 1865.
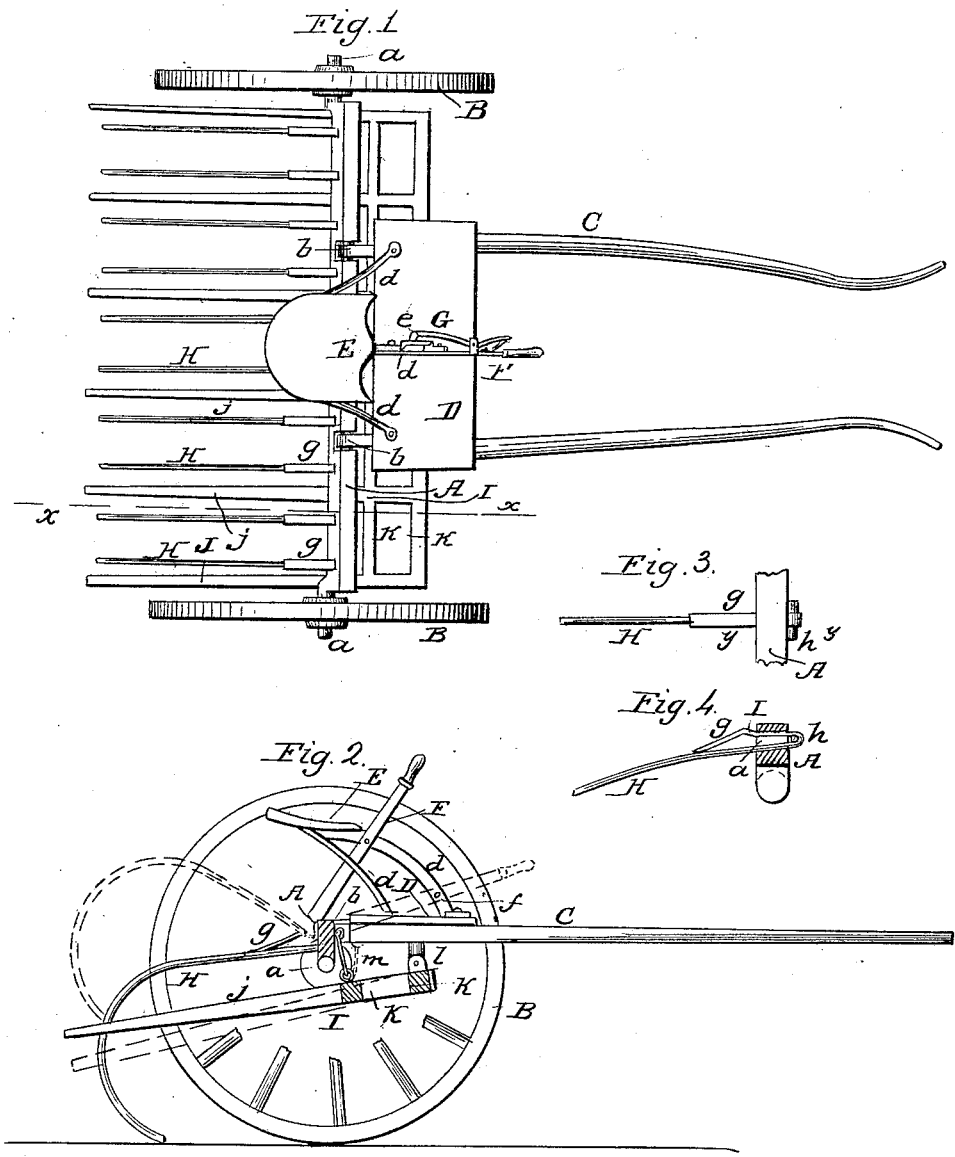

UNITED STATES PATENT OFFICE.

WATSON KING, OF SPRINGFIELD, ILLINOIS.

IMPROVEMENT IN HORSE-RAKES.

Specification forming part of Letters Patent No. 51,322, dated December 5, 1865.

*To all whom it may concern:*

Be it known that I, WATSON KING, of Springfield, in the county of Sangamon and State of Illinois, have invented a new and Improved Horse-Rake; and I do hereby declare that the following is a full, clear, and exact description thereof, which will enable others skilled in the art to make and use the same, reference being had to the accompanying drawings, forming a part of this specification, in which—

Figure 1 is a plan or top view of my invention; Fig. 2, a side sectional view of the same, taken in the line $x\,x$, Fig. 1; Fig. 3, a plan or top view of portion of the rake, showing one tooth of the same; Fig. 4, a section of Fig. 3, taken in the line $y\,y$.

Similar letters of reference indicate like parts.

This invention relates to a new and improved arrangement of means for operating the rake, raising and lowering the same so that it may be adjusted to its work with facility, and the load readily discharged therefrom when required.

The invention also relates to a new and useful improvement in the rake-teeth and the mode of securing them in the rake-head, whereby it is believed that an advantage is obtained over the ordinary horse-rakes now in use.

A represents the axle of the machine, which also forms the rake-head; B B are the wheels, fitted loosely on arms $a\,a$, which extend down from the ends of the axle in crank form.

The axle A is fitted in bearings $b\,b$, which are connected permanently to the rear cross-piece of the thills C C. D is a platform which is secured on the rear of the thills, and to which the supports $d$ of the driver's seat E are attached, the front support, $d$, being curved so as to form a portion of a circle the center of which coincides with the arms $a\,a$ of the wheels B B.

F is a lever attached to the axle A and fitted to the curved support $d$ by a guide, $e$, said lever being provided with a catch, G, to fit into or engage with two holes, $f$, in the support and secure or hold the rake-teeth in an elevated and in a downward or working position, as shown clearly in Fig. 2, the upward position of the teeth being shown in red outline.

H represents the rake teeth, which are of wire and curved similar to those now in use. (See Fig. 2.) The teeth, however, are constructed or formed at their upper ends and attached to the axle or rake-head in a novel manner, the upper ends being flattened and then bent over backward on the teeth, as shown at $g$. These parts $g$ serve as springs for the teeth H, and they also serve as loops through which keys $h$ pass to secure the teeth in the axle or rake-head, (see Figs. 3 and 4,) the upper parts of the teeth, with the parts $g$, passing through mortises $a^x$ in the axle, and the parts $g$, curved or bent in such a manner, as shown at $i$, Fig. 4, that they may, under the action of the keys, be firmly drawn into the mortises. (See Fig. 4.) By this arrangement the teeth may be readily secured to and detached from the axle or rake-head, while the springs $g$ serve to keep the teeth in proper working position, and at the same time admit of their yielding or giving to the inequalities of surface over which they may pass.

I represents a frame composed of a series of parallel straight bars, $j\,j$, connected at their front ends to cross-bars $k\,k$. The front bar, $k$, of this frame I is attached by jointed or hinged pendants $l\,l$ to the under side of the platform. The rear bar, $k$, is suspended by links $m$ to the axle A. (See Fig. 2.)

From the above description, it will be seen that when the lever F is shoved down the axle A will be turned and the rake-teeth H elevated; and as said teeth rise the frame I will be lowered and the hay raked up from the teeth discharged from them. This downward movement of frame I admits of a comparatively short upward movement of the teeth in order to discharge the load or free the teeth from it; and by the arrangement as herein shown and described a very simple and efficient means is obtained to effect that end.

I claim as new and desire to secure by Letters Patent—

1. The combination of the crank-arms $a\,a$ with the axle A, wheels B, bearings $b$, thills C, teeth H, clearing-frame I, joint $l$, and link $m$, all as specified.

2. The springs $g$ and tapering loops $i$, formed upon the butt-ends of the teeth and employed in connection with tapering sockets $a^x$ and keys $h$, as and for the purposes set forth.

WATSON KING.

Witnesses:
M. M. LIVINGSTON,
C. L. TOPLIFF.